Feb. 25, 1936.  R. C. L. P. TURGOT  2,031,747
BRAKE
Original Filed June 23, 1931  2 Sheets-Sheet 1
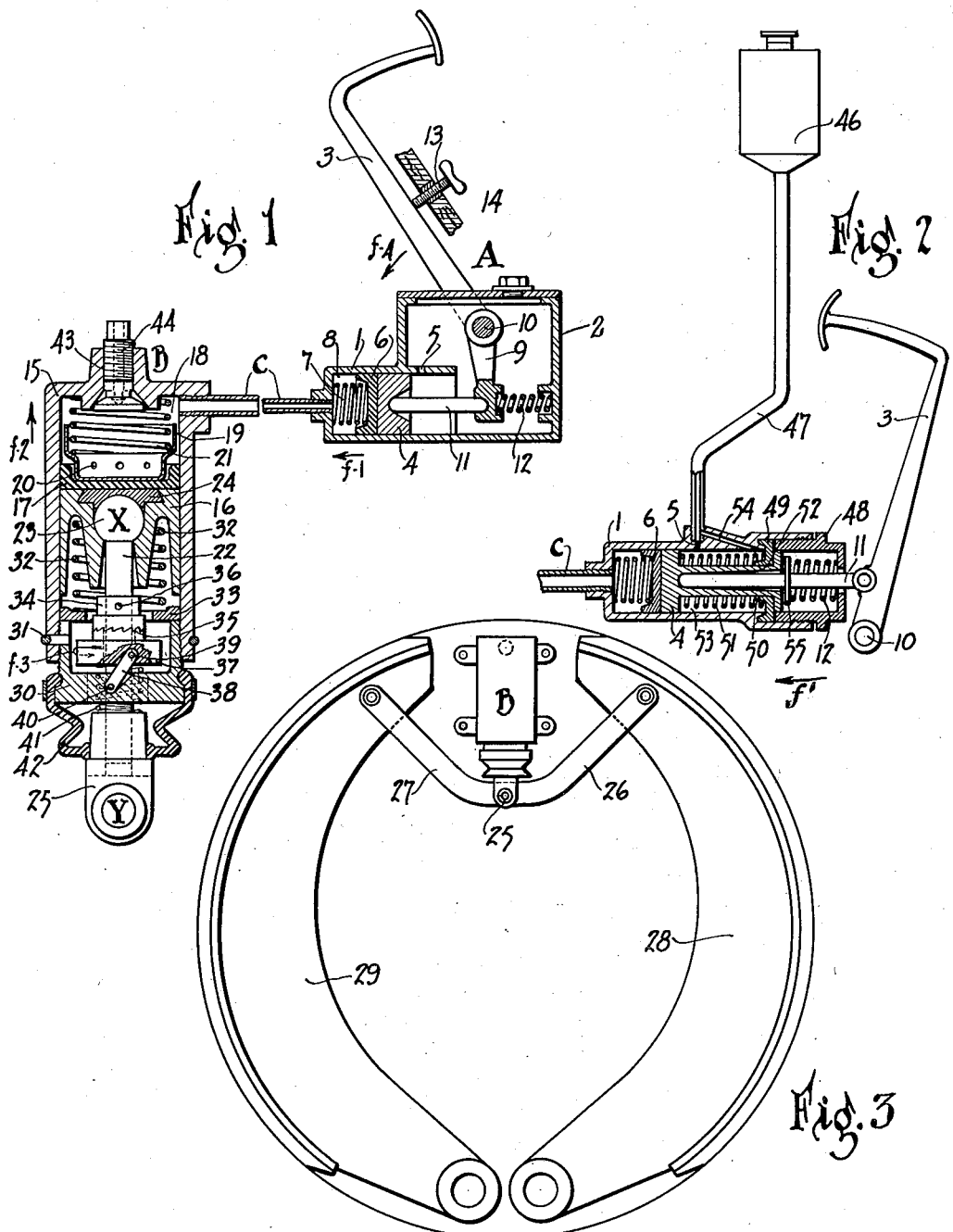
INVENTOR.
Robert Charles Louis Pierre Turgot
BY McConkey and Smith
ATTORNEYS.

Feb. 25, 1936.  R. C. L. P. TURGOT  2,031,747
BRAKE
Original Filed June 23, 1931  2 Sheets-Sheet 2
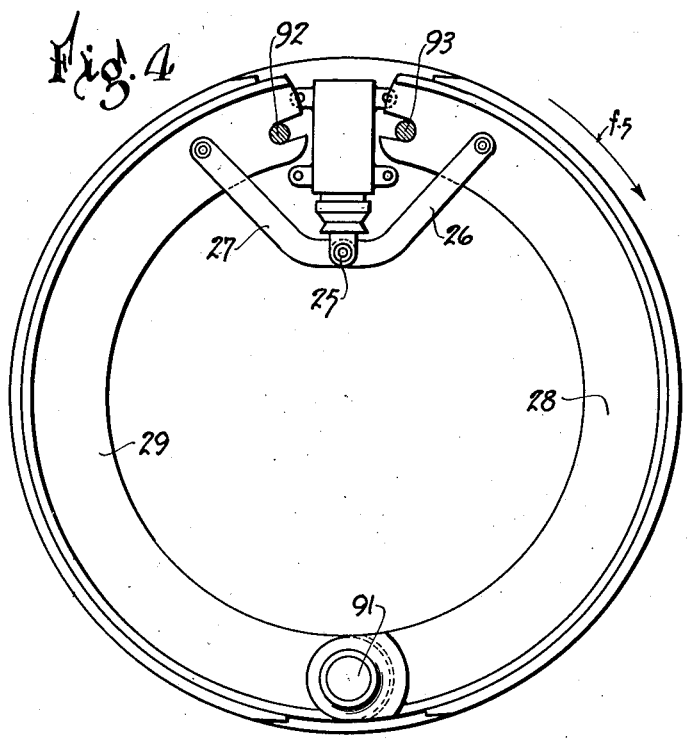
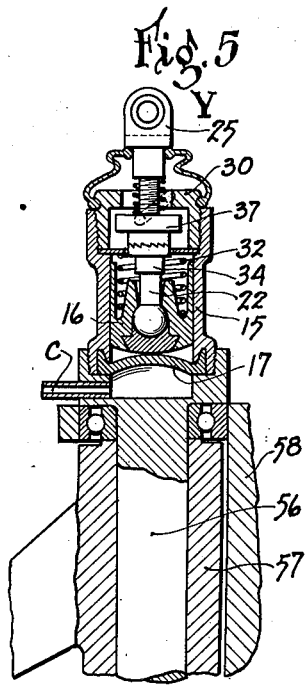
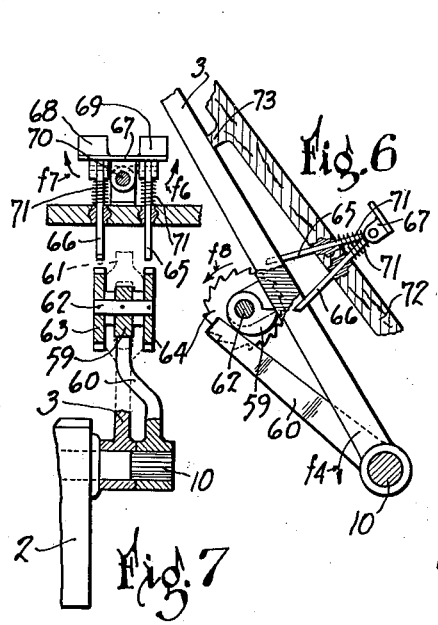
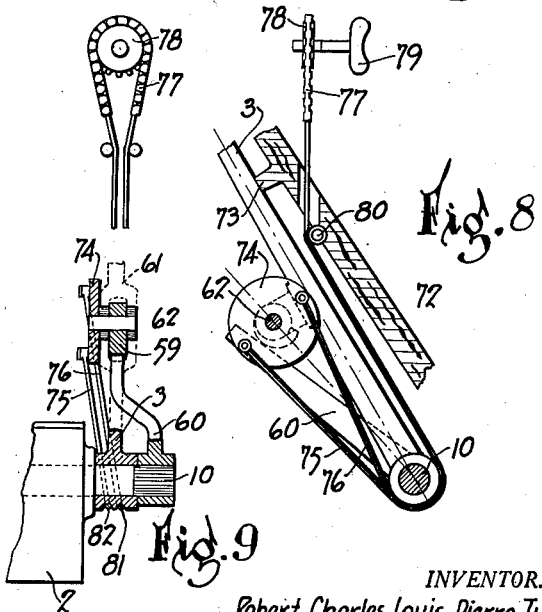
INVENTOR.
Robert Charles Louis Pierre Turgot
BY McConkey & Smith
ATTORNEYS Patented Feb. 25, 1936

2,031,747

UNITED STATES PATENT OFFICE 2,031,747

BRAKE

Robert Charles Louis Pierre Turgot, Saint Etienne de Cuisnes, Savoie, France, assignor, by mesne assignments, to Bendix Brake Company, South Bend, Ind., a corporation of Illinois Original application June 23, 1931, Serial No. 546,342. Divided and this application March 9, 1934, Serial No. 714,802. In France June 23, 1930

3 Claims. (Cl. 188—79.5)

This invention relates to brakes and more particularly to adjusting means for brake operating devices.

All hydraulic systems in which the desired operation is effected by the increase in the pressure of a fluid are subject to a serious weakness, namely, that the system is incapacitated by the occurrence of a leak in any part of the system, whereby the transmitting fluid may be lost and its pressure dissipated. In hydraulic brake systems this weakness is doubly important due to the great danger under which the failure of a braking system places the occupants of a vehicle. This has been recognized in railway braking, resulting in the standard and required equipment of trains with reduction-pressure braking systems, but heretofore no method has been successfully and practically worked out for utilizing this reduction-pressure method for braking automotive vehicles.

It is, therefore, an object of the present invention to provide novel and improved hydraulic braking means which operate to effect brake application on a reduction in the pressure of the fluid in the system.

It is another object of the invention to provide a reduction pressure braking system utilizing spring means both for brake application and brake release.

Another object of the invention is to provide a braking system wherein the fluid is used to transmit pressures between two springs which are normally balanced.

Another object of the invention is to provide a braking system in which manual operation to initiate braking causes expansion of the fluid in the system, thereby releasing the operating spring.

Another object of the invention is to provide novel and improved automatically-operable means for effecting adjustment of the brake shoes with respect to the drum.

Another object of the invention is to provide automatic adjusting means for the brake shoes in which the movement of the adjusting means is always proportional to the movement of the brake shoes both in longitudinal and rotational movement of the adjusting means.

A still further object of the invention is to provide novel and improved manually-operable means under control of the brake shoes with respect to the drum, such adjusting means acting through the entire braking system to simultaneously adjust all the parts thereof.

Other objects and features of novelty will be apparent from the following detailed description when taken in connection with the accompanying drawings. It is to be expressly understood however, that the drawings are for purposes of illustration only and are not designed as a definition of the limits of the invention, reference being had for this purpose to the appended claims.

In the drawings wherein similar reference characters refer to like parts throughout the several views:

Figure 1 is a vertical section of a control device according to the invention, in this diagram the group of transmitting elements being shown on a scale smaller than that of the receiving elements;

Figure 2 is a vertical section of another structure illustrating a control transmitting device constructed according to the invention;

Figure 3 is a view in elevation showing an application of the device to an automobile brake;

Figure 4 is a view in elevation showing an application of the device to another automobile brake;

Figure 5 is a longitudinal section showing the adaptation of a similar control device to the front wheel of an automobile;

Figure 6 is an elevation of an adjusting device for the control device;

Figure 7 is a side view of this same arrangement the same being partly in section;

Figures 8 and 9 are views, similar to Figures 6 and 7, of a modification of the adjusting device.

According to the form of construction shown in Figure 1, the control device is composed of two groups of elements, one, A, which is the transmitter, is situated preferably at the actual controlling spot and directly connected with the operating mechanism, either lever or pedal. The other, B, which is the receiver, is situated at any convenient distance from the former and directly coupled to the controlled mechanism, brake jaws or any other mechanism. These two groups of elements, A and B, are connected by a piping C containing the transmitting fluid.

In the transmitting group A, the pipe C enters a cylinder 1 formed integrally with a housing 2 acting, preferably, as a tank for the liquid and also providing trunnions for pivotally mounting the pedal, the lever or any other control element 3. A piston 4 slides in the cylinder 1. The cylinder 1 communicates with the tank 2 through a hole 5 in the wall of the said cylinder when this port is uncovered by the piston 4. A small cup 6 is pressed against the face of the piston on the same side as piping C by a small spring 7 and insures that there shall be no leakage in chamber 8. A lever 9, fixed to a cross shaft 10 controls piston 4 through a rod 11. A large compression spring 12 bears at one end on lever 9 and at the other end on the housing 2 and urges piston 4 in the direction of the arrow $f^1$. The shaft 10 protrudes through one side of the housing 2 and the pedal 3 is fixed on this shaft outside housing 2. A screw 13 screwed into a plank or a frame 14 supplies means for adjusting the rest position of pedal 3 by hand.

The piping C is connected, at its other end, to a cylinder 15 which serves as a housing for the group of receiving elements B. A piston 16 is slidably mounted in cylinder 15. On the face of the piston which is on the same side as the piping C, a small cup 17 is mounted, thus preventing any leakage of fluid in space 18. A socket 19, perforated with holes 20, is placed against the small cup 17 and retained by a spring 21 which rests on the cover of the cylinder 15. This socket limits the travel of piston 16 in the direction of the arrow $f^2$.

Piston 16 is connected to a rod 22 by means of a ball joint 23 which is integral with this rod. The joint 23 is loosely enclosed in piston 16 so that it may be free to oscillate. A plug 24 is set, for instance, on piston 16 in order to prevent the ball joint 23 from leaving its recess. At the other end of rod 22 a yoke 25 is secured and connected with the elements to be controlled (this yoke 25 is screwed on to the right in the example represented in Figure 1).

This yoke is connected to the element or elements to be controlled. For instance in the case of vehicle brakes shown in Figures 4 and 5, two rods 26 and 27 are articulated both at one end in yoke 25 and on the other hand on the brake jaws 28 and 29.

Rod 22 can slide (Figure 1) in a plug 30 closing the end of cylinder 15. This plug 30 is screwed onto the cylinder for instance and locked by means of a locking piece 31. A powerful spring 32 bears at one end on piston 16 and at the other end on a washer 33 which bears against the plug 30. This control gear is, preferably, fitted with an automatic adjusting device in the event of there being any wear of the element controlled, which is particularly the case in the case of a brake control.

In the example represented in Figure 1, a ring 34, provided with teeth 35, is fixed on rod 22 by means such as a cotter pin 36. This ring 34 engages with another ring 37 free to turn and slide on rod 22. The teeth on these two rings are so arranged that ring 37 can drive ring 34 only in one direction. Ring 37 is connected to the plug 30 through rods 38 articulated by pins 39 and 40 on the said ring 37 and on plug 30. In this way when ring 37 moves longitudinally in the direction of arrow $f^2$, rods 38 compel it to turn about rod 22 in the direction of arrow $f^3$. A spring 41 which bears on the one hand on yoke 25 and on the other on ring 37 keeps the latter in contact with ring 34.

Leather or rubber bellows 42 are attached at one end to cylinder 15 and at the other end to plug 30 to protect the assembly from dust and water. This device includes, in addition, at the upper end of the cylinder 15, a port 43 closed by a screw-plug 44 permitting the evacuation of the air or gases contained in cylinders 15 and 1 and the pipe line C when filling.

Operation is as follows: Tank 2, cylinders 1 and 15 and pipe line C being full of liquid, occupy positions indicated for each of them in Figure 1 when at rest. In this position the power exerted by spring 12 on piston 4 is balanced by the power exerted by spring 32 on piston 16. This is easily realized by giving suitable values to the surfaces of pistons 4 and 16 and springs 12 and 32 (owing to their weakness the action of springs 7, 21 and 41 need not be taken into account).

When pedal 3 is depressed, cross shaft 10 is rotated in the direction of arrow $f^4$. Lever 9 compresses spring 12 which reduces the pressure of the liquid in proportion with the travel of the pedal. The equilibrium of pressure in cylinder 15 is destroyed and piston 16 moves forward in the direction of arrow $f^2$ under the action of a force equal to the pressure of spring 32 less the force of the pressure of the liquid.

If the travel of the pedal is such that the small cup 6 uncovers port 5, the liquid contained in the pipe line C and in cylinders 1 and 15 is under atmospheric pressure. The result is that the effort applied on piston 16 and on rod 22 in the direction of arrow $f^2$ is equal to the pressure of spring 32.

Therefore, on pedal 3 being depressed, as the pressure of the liquid diminishes, piston 16 and rod 22 move in the direction of arrow $f^2$, owing to the action of spring 32. The elements connected with yoke 25 follow this movement. For instance (Figures 3 and 4) if the yoke 25 moves upward the brake shoes 28 and 29 are pushed apart and applied against the drum while ensuring an equal distribution of the effort on each jaw. Moreover in cases where the device is applied to brakes acting on the unrolling system (Figure 4), the drive of one of the shoes (shoe 28 for instance if the drum is revolving in the direction of arrow $f^5$), causes yoke 25 which is already being driven upward by spring 32 to be drawn upward in addition by the servo-braking effect applied to shoes 28 and 29. Shoes 28 and 29 are joined to each other at their lower ends by a shoe link pin 91 and are adapted to anchor (depending upon the direction of drum rotation) upon anchor pins 92 and 93. This servo-braking effect reduces the effort to be applied to the pedal by the driver to an equal extent.

It should be noted that if a leak occurs in the pipe line C or in cylinders 1 and 15, the pressure of the liquid drops as is the case if one presses pedal 3 to the end of its travel so that, for instance, in the adaptation of this device to the brakes of a vehicle a leak would cause immediate braking.

The same phenomenon occurs as soon as the liquid evaporates. If there is a formation of gases this gas is compressed and this reduces the pressure of the liquid. This makes it possible to employ any sort of liquid in the apparatus. It is obvious that this device offers a guarantee of absolute safety.

When pedal 3 is released, whether port 5 has been uncovered or not by cup 6, spring 12 compresses the liquid and piston 4 is driven in the direction of arrow $f^1$ until it reaches the position of equilibrium it occupied originally, this position depending on the pressure of the liquid which, in turn, depends on the power of springs 12 and 32 and on the surfaces of pistons 4 and 16. Piston 16 and yoke 25 also return to their rest position releasing shoes 28 and 29 and the other organs they control. It will be seen that the shoes are always positively operated in either direction strictly in accordance with the wish of the operator. It is not necessary that the piston 4 on the cup 6 should move to the right (Figure 1) past the port 5 every time the pedal is actuated (this is only necessary when filling). In order to obtain a sufficient effort on rod 22 all that is necessary is to cause a suitable variation in the strength of spring 32 or the surface of piston 16 as compared with the section of piston 4 and the strength of spring 12. It will be seen clearly that these various values are equal, in actual value, to those which would be necessary for braking by compressing the liquid as in the systems known to date, the sign alone having changed.

As has been noticed, given a balancing pressure, the moving components, and in particular ring 34, return to the same position. Should there be wear of the element controlled by yoke 25 (Figure 1), in order to retain the same functioning conditions, for instance the same play between shoes 28 and 29 and the brake drum in the case of a brake, it will be necessary to reduce length XY of rod 22 by an amount in proportion to that wear. It is for that reason and to keep the travel of the pedal 3 constant that the automatic adjustment described above has been provided. Operation is as follows: When piston 16 moves in the direction of arrow $f^2$ it actuates ring 34. Ring 37 under the action of spring 41 also moves in the same direction but rotates in the direction of arrow $f^3$ owing to the fact that it is connected with plug 39 by rods 38. When the travel of ring 34 reaches a certain value, determined in advance, ring 37 turns, in relation to ring 34, by the value of one tooth. When ring 34 returns to its initial position it presses hard on ring 37 which, when it approaches plug 39, is compelled to rotate in a direction opposite to that of arrow $f^3$ drawing along, in its rotating motion, ring 34 and rod 22. Rod 22 therefore screws into yoke 25 and thus reduces the distance XY between the yoke and ball joint 23 by the required amount. It is necessary to calculate properly the pitch of teeth 35, the length and the displacement of rods 38 and the thread of rod 22.

Figure 2 represents another method of realization of transmitting group A. In the example set forth cylinder 1 communicates with a separate tank 46 through piping 47 and a side port 5 which can be opened and shut by piston 4. Cylinder 1 is closed at one end by plug 48 preferably screwed into it, a cup 49 between the cylinder and the plug resting on a shoulder in said cylinder 1. A socket 50 is pressed against this cup by a spring 51 resting on the one hand on this socket 50 and on the other hand on the top of piston 4. The cup is thus maintained pressed against the center portion 52 of piston 4, and prevents any loss of the liquid contained in the annular space 53. A port 54 in the side wall of cylinder 1 places space 53 in communication with tank 46, thus permitting the return of the liquid into this tank when piston 4 moves in a direction opposite to arrow $f^1$. Rod 11 is directly articulated on operating pedal 3 which is pivoted on a spindle 10. A powerful spring 12 rests on the one hand on plug 48 and on the other hand on a washer 55 fixed to rod 11 in any suitable manner, the said spring urging piston 4 in the direction of arrow $f^1$.

The operation of this system is the same as in the case of the arrangement described previously, the pressure of the liquid being reduced when one depresses the pedal 3 against spring 12 in a reverse direction to arrow $f^1$.

The control system represented in Figure 5 is applied to the front wheel of an automobile. In this example of application, cylinder 15 is fixed to the swivelling spindle 56 of the wheel the axle of which is shown at 57 and one of the stub axles at 58. Piston 16 is cambered and cup 17 made tight in such a way that it cannot slide. Operation is the same as in the example shown in Figure 1, the sliding of cup 17 being replaced by the elastic deformation of the said cup.

For preference the control system comprises an adjusting device which permits of modifying rapidly and at will, in either direction, the rest position of the moving components of the control system, while the operating pedal retains an invariable rest position. In the examples shown in Figures 6 to 9, pedal 3 is fitted loose on shaft 10 and bears, by means of a cam 59 which can be made fast in any desired position, on a lever 60 which is rigid with shaft 10.

Pedal 3 (Figures 6 and 7) comprises a yoke 61 in which a shaft 62 is free to oscillate. On this shaft two toothed wheels 63 and 64, are fixed and, preferably between these two wheels is provided a cam 59. Wheel 63 which is not shown on Figure 6, bears teeth placed in an inverse position to those on wheel 64. A push rod 65 placed towards the top can control wheel 64 and another rod 66 placed towards the bottom can control wheel 63. These two rods are articulated to an equalizing lever 67 comprising two plates 68 and 69 and itself articulated at 70 so that it can oscillate in the direction of arrows $f^6$ and $f^7$. Two springs 71 guided by rods 65 and 66, rest at one end on a floor or base 72 and at the other end on the ends of equalizing lever 67, urging the latter to its rest position. A fixed check 73 permanently determines the rest position of pedal 3. It is to be understood that the openings through the floorboard 72 are sufficiently large to permit the operation of the rods 65 and 66 without jamming.

The adjustment of the control element is modified as follows: Depression of end 69 of the equalizing lever 67 pushes rod 65 thereby causing wheel 64 to rotate and consequently cam 59 in the direction of arrow $f^8$. Owing to the shape of the cam, lever 60 comes nearer pedal 3 and drives shaft 10 in a direction reverse to arrow $f^4$. This causes a displacement of piston 4 in the direction of arrow $f^1$, an increase in the pressure of the transmitting liquid, and a displacement of piston 16, rod 22 and yoke 25 in a direction contrary to that of arrow $f^2$. The effect of this displacement is to bring jaws 28 and 29 (Figures 3 and 4) nearer one another thus reducing the play between the said jaws and the brake drum. It is thus possible, from the driver's seat and even while the car is moving, to loosen the brakes should they remain on.

It is also possible to reduce the play between jaws 28 and 29 and the brake, in the contrary case. All one has to do is to press on the end 68 of equalizing lever 67. Rod 66 acts on the toothed wheel 63 and causes it to rotate, as well as cam 59, in a direction contrary to that of arrow $f^8$. Lever 60 moves away from pedal 3 and makes shaft 10 rotate and this causes a reduction of pressure in the transmitting liquid and the displacement of the yoke in the direction of arrow $f^2$.

Figures 8 and 9 represent a similar arrangement in which the control of cam 59 is effected by chains or cables and by hand. In this arrangement a plate 74 is rigid with a shaft 62 solid with cam 59. On this plate, on either side of shaft 62, the ends of two cables 75 and 76 are attached and their other ends are attached to the ends of a chain 77 which passes over a toothed wheel 78. A handle 79 is solid with wheel 78. Handle 79, wheel 78 and chain 77 may be placed, for instance, on the dash of the car. The cables 75 and 76 are carried on one or more idler pulleys 80. They also pass through the grooves 81 and 82 of pedal 3 so that in its rotation this pedal may not influence the length of the cables and consequently the adjustment.

Operation is the same as in the preceding case. It is sufficient to turn handle 79 one way or the other.

While there has been shown and described one embodiment of the invention, it is to be understood that the invention is not limited thereto. Various changes in the shapes, sizes and manner of assembling the various component parts may be resorted to without departing from the scope of the invention, as will occur to those skilled in the art. Reference will therefore be had to the appended claims for a definition of the limits of the invention.

This application is a division of my co-pending application Serial No. 546,342, filed June 23, 1931.

I claim:

1. A brake comprising a drum, a backing plate, a friction member, a support on the backing plate, a threaded rod longitudinally slidable to apply the friction member to the drum, a threaded sleeve connected to the friction member into which sleeve the threaded end of the rod is adapted to be screwed, a toothed collar secured to the rod, a second toothed collar slidable on and rotatable on the rod, and links pivotally connected to the support and to the second collar.

2. A brake comprising a drum, a backing plate, a friction member within said drum, a cylindrical support member secured to the backing plate, a threaded rod slidable longitudinally in said cylindrical member to apply the friction member, a threaded sleeve connected to the friction member into which sleeve the rod is adapted to be screwed, a toothed collar secured to the rod, a toothed collar slidable and rotatable on the rod, and links pivotally connected to the cylindrical member and to the second collar.

3. A brake comprising a drum, a backing plate, a friction member within the drum, a support mounted on the backing plate, a threaded rod longitudinally slidable to apply the friction member to the drum, a threaded sleeve connected to the friction member into which sleeve the rod is adapted to be screwed, a toothed member secured to the rod, a second toothed member slidable and rotatable on the rod, and links pivotally connected to the support and to the second toothed member.

ROBERT CHARLES LOUIS
PIERRE TURGOT.